Sept. 29, 1942.   M. H. HANSEN   2,296,923
SCALE
Filed March 28, 1940
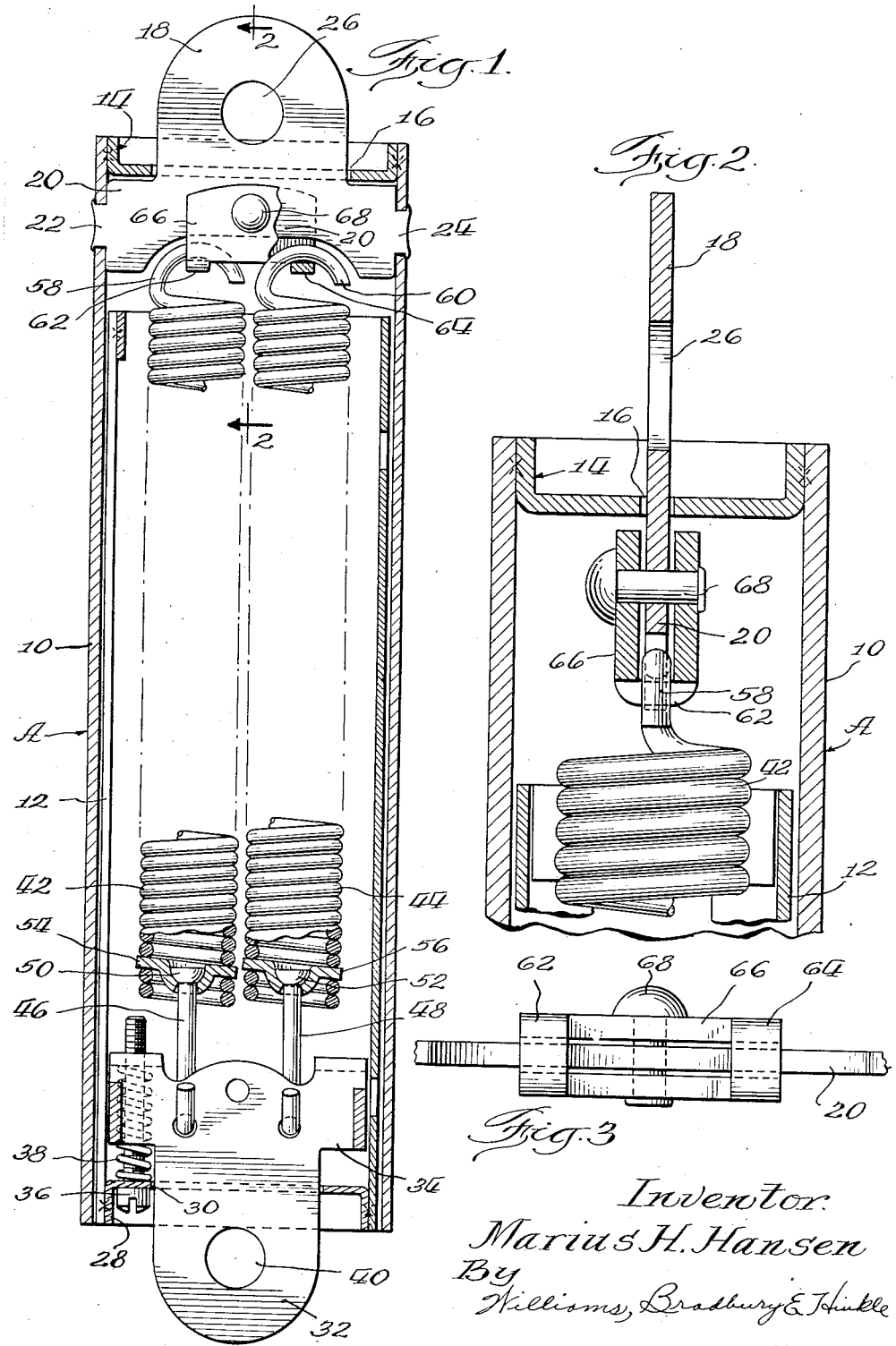
Inventor:
Marius H. Hansen
By
Williams, Bradbury & Hinkle
Attys.

Patented Sept. 29, 1942

2,296,923

UNITED STATES PATENT OFFICE 2,296,923

SCALE

Marius H. Hansen, Chicago, Ill., assignor to Hanson Scale Company, Chicago, Ill., a corporation of Illinois Application March 28, 1940, Serial No. 326,304

4 Claims. (Cl. 265—63)

My invention pertains to scales, and is more particularly concerned with scales of the spring type.

I have found that even in relatively small and inexpensive scales of the spring type, it is desirable to use two springs in lieu of a single spring in order to obtain greater accuracy and longer life. Heretofore it has been impracticable to use two springs in scales of this type because of the cost of this construction and the impossibility of making a simple, cheap, and compact construction which would utilize the maximum advantage of the two springs.

An object of my invention is to provide a spring scale which will be simple and cheap to manufacture, rugged and durable in all kinds of service, and which will utilize to the utmost the increased advantages of two springs over the single spring heretofore used.

Another object of my invention is to provide a compensating mechanism to insure equal tension on both springs and so constructed that binding of the pivot means is overcome whereby the maximum efficiency and accuracy are obtainable.

Another object of my invention is to provide a pivoted compensating mechanism wherein the spring ends which are connected to this mechanism lie in a plane perpendicular to the pivot axis.

Another object of my invention is to provide a compensating mechanism having a pivotal connection located above the point at which the spring ends are connected to the mechanism.

Other objects and advantages of my invention will become apparent from the ensuing description of an embodiment thereof, in the course of which reference will be had to the accompanying drawing, wherein:

Figure 1 is a vertical section through a scale embodying my invention;

Figure 2 is a sectional view taken on the line 2—2 of Figure 1; and,

Figure 3 is a bottom view of the compensating mechanism.

In the drawing I have illustrated a scale having a housing indicated generally by the letter A and comprising an outer tubular member 10 and an inner tubular member 12, the said members 10 and 12 being telescopically arranged relative to each other. The upper end of the member 10 is closed by a head 14 welded or otherwise suitably attached to the member 10. The head 14 has a slot 16 through which there projects the upper end 18 of a plate 20 having lateral extensions 22 and 24 passing through suitable openings provided in the sides of the member 10 and riveted or otherwise suitably secured to such sides. The plate 20 has an opening 26 adapted to receive a hook, nail, or other support from which the scale may be suspended.

The lower end of the inner tubular member 12 is closed by a head 28 welded or otherwise suitably secured to the member 12, and this head is provided with a slot 30 through which there projects the lower end 32 of a plate 34 adjustably connected to head 28 by screw 36. A spring 38 surrounds the screw 36 and prevents accidental displacement thereof from adjusted position. The plate 34 has an opening 40 adapted to receive the hook of a platform or other suitable support for articles to be weighed.

The tubular members 10 and 12 are normally held in fully telescoped position by a pair of springs 42 and 44 attached to the plates 20 and 34 in a manner which I shall now describe. It will be understood by those skilled in the art that the springs 42 and 44 are preferably made of the best material and are so constructed that a predetermined weight gives a predetermined and invariant elongation. The springs 42 and 44 are connected to the plate 34 by hooks 46 and 48 whose lower ends extend through suitable openings provided in the plate 34. The upper ends of the hooks 46 and 48 are provided with knobs 50 and 52 having hemispherical surfaces engaging complementary surfaces provided by recesses formed in washers 54 and 56. The hooks extend through central openings in the washers 54 and 56 in spaced relation to the sides of such openings so that the knobs on the hooks have a ball-and-socket joint relationship to the washers 54 and 56. In the initial assembly of the scale, the washers 54 and 56 are so located between the coils of the springs 42 and 44 respectively that the springs are subjected to equal tension when my improved compensating mechanism is in central position.

The upper ends of the springs 42 and 44 are provided with integral hooks 58 and 60 which, in the preferred embodiment illustrated, are shown as engaging straps 62 and 64 formed by cutting away the central portion of a compensator plate 66 which is subsequently bent into a U-shape. As most clearly shown in Fig. 3, the sides of the U-shaped compensator 66 are in spaced relation to the portion of the plate 20 located therebetween, thereby eliminating the friction loss which would result if the compensator 66 and plate 20 contacted each other. The parts 66 and 20 are pivotally connected by a rivet 68 which is preferably, but not necessarily, fixed relative to the compensator 66 and oscillates in the plate 20.

It is to be noted that the straps 62 and 64 are located well below the axis of the rivet 68 and that the spring hooks which engage these straps are spaced below the lower edge of the plate 20, as clearly shown in Figs. 1 and 2, so that the compensator 66 is free to oscillate relative to the plate 20.

Another important feature of my invention resides in the particular positioning of the spring hooks 58 and 60 relative to the pivot axis. The spring hooks 58 and 60 lie in a plane perpendicular to the pivot axis and preferably passing through the center of the pivot bearing, thereby avoiding any tendency to cause binding of the pivot with resulting frictional loss and inaccuracy. The left-hand ends of the hooks 58 and 60 constitute a continuation of the spring wire, wherefore these hooks exert a greater pull on the left-hand edges of the straps 62 and 64, as viewed in Fig. 1, than on the right-hand edges of these straps, but because of my novel construction, this causes no twisting or binding of the pivotal connections between the compensator 66 and plate 20. The slight variations in distance between the left-hand edge of strap 62 and axis of pivot 68, as compared with the distance between the left-hand edge of strap 64 and the pivot axis, is automatically compensated for by the pivotal shift of the compensator 66, if not otherwise provided for at the time the scale is initially assembled. When the scale is assembled, it is ordinarily preferable to locate the washers 54 and 56 so that the compensator 66 is horizontal when the springs 42 and 44 are under the same tension.

In the preferred construction, the tubular members 10 and 12 are made of rectangular cross section, since this prevents relative rotation between these members. These members may be made of any other desired cross section, but if they are made circular in cross section, some means should be provided to prevent such relative rotation, unless it is desired. It will be understood that one of the tubular members is preferably provided with suitable indicia and the other tubular member is preferably provided with a pointer or other means for indicating the relative displacement between the two members for any given load. Such indicating means may be of the kind disclosed in my prior application Serial No. 239,847, filed November 10, 1938, which contains claims to subject matter disclosed but not claimed in the instant application.

It is to be understood that the preferred embodiment of my invention described in detail herein is merely illustrative and should not be construed to limit the invention in any way.

What I claim as new and desire to secure by Letters Patent is as follows:

1. In a scale of the class described, the combination of a pair of relatively movable members, a U-shaped compensator, means pivotally connecting said compensator to one of said members, said means having an axis passing through both sides of said compensator adjacent the free ends of said sides, said compensator having a bent portion cut away to provide a pair of spring supports, a pair of springs having hooks engaging said supports, said supports being positioned to maintain said hooks in a plane perpendicular to the axis of said pivotal means, and means connecting the other ends of said springs with said other member.

2. Compensating means for connecting relatively movable members comprising in combination a U-shaped compensator, a pivot connecting said compensator to one of said members, said pivot having an axis perpendicular to the sides of said compensator and adjacent the free ends of said sides, the bent portion of said compensator being cut away to provide a pair of integral straps connecting the sides of said compensator and located on opposite sides of said axis, a pair of springs secured to the other of said members, and hooks provided by said springs and engaging said straps, said hooks being held by said compensator in a plane perpendicular to said axis.

3. Compensating means for connecting relatively movable members comprising in combination a U-shaped compensator, means pivotally connecting said compensator to one of said members, said means having an axis passing through both sides of said compensator adjacent the free ends of said sides, the bent portion of said compensator being provided with a central opening forming a pair of straps connecting the sides of said compensator, and a pair of springs connected to said other member and having hooks engaging said straps.

4. Compensating means of the class described for connecting a pair of relatively movable members and comprising an integral U-shaped compensator formed from a single piece of metal, a pivot connecting said compensator to one of said members, said pivot having an axis passing through the sides of said compensator adjacent the free ends of said sides, the bent portion of said compensator being cut away to provide a pair of spring supporting straps located on opposite sides of said axis, a pair of springs having hooks engaging said straps, said hooks being held by said compensator straps in a plane perpendicular to the axis of said pivot, and means adjustably connecting said springs to the other of said members.

MARIUS H. HANSEN.